INVENTORS
WLADIMIR NESTEROFF
YVES LANCELOT
BERNARD DAVID

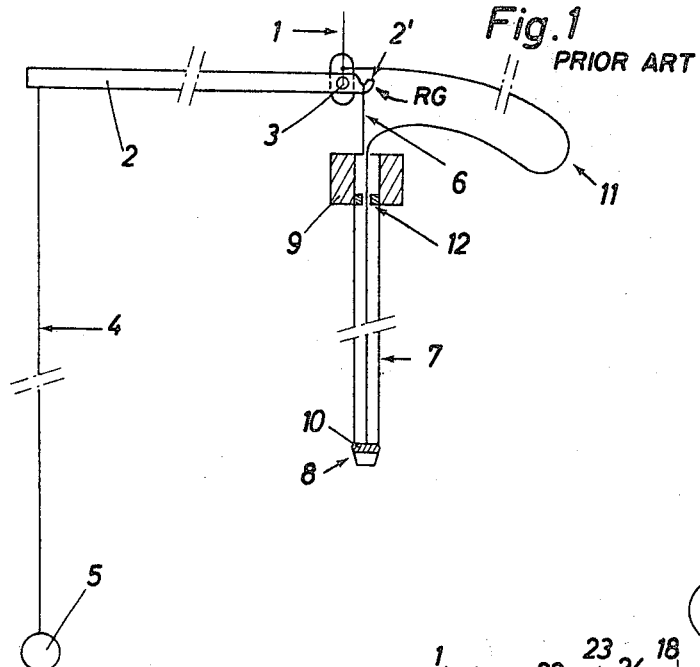
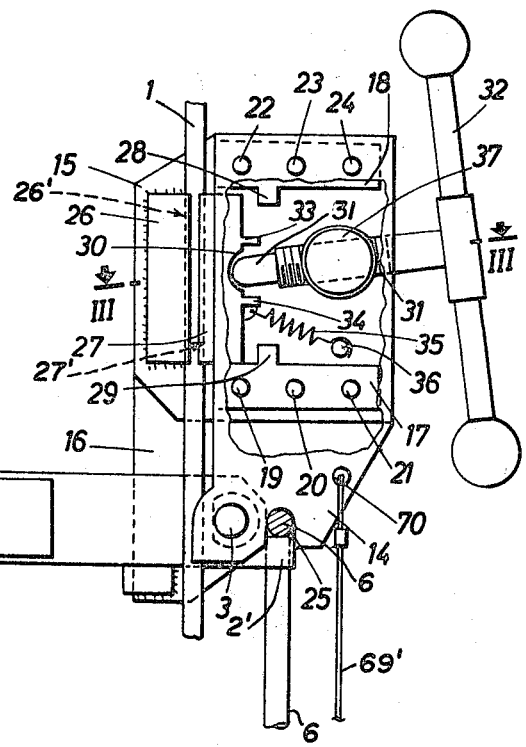
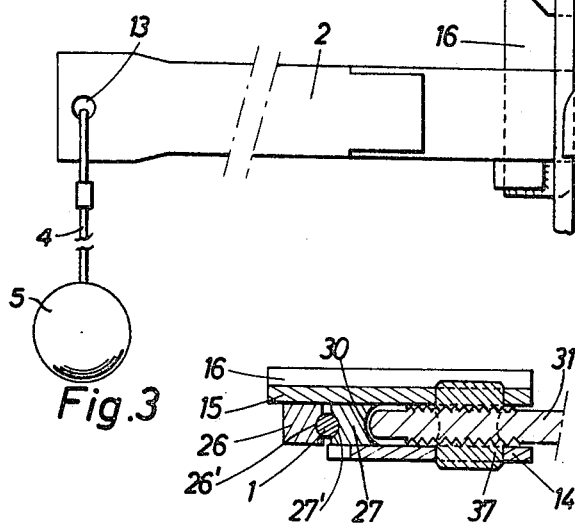
Inventors:
Wladimir Nesteroff
Yves Lancelot
and
Bernard David
By Baldwin Wight Diller & Brown, Attorneys

BY *Baldwin Wight Diller & Brown*
ATTORNEYS

United States Patent Office 3,429,388
Patented Feb. 25, 1969

3,429,388
SOLID MATERIAL SAMPLER PARTICULARLY FOR UNDERWATER SOIL SAMPLING
Wladimir Nesteroff, Yves Lancelot, and Bernard David, Paris, France, assignors to Etablissement Public: Centre National de la Recherche Scientifique, Paris, France, a corporation of France
Filed Jan. 26, 1967, Ser. No. 611,929
U.S. Cl. 175—245             12 Claims
Int. Cl. E21b 9/20, 7/12; G01n 1/08

ABSTRACT OF THE DISCLOSURE

A device for sampling solid material includes a vertical core barrel having an open lower end adapted to penetrate material to be sampled, and a piston in the barrel. The barrel is suspended releasably by means including a lowering cable portion and a clamping device comprising two relatively movable jaws between which the cable portion extends. Clamping of the cable by the jaws is effected by a screw threadably mounted in a member in turn mounted for pivotal movement about an axis transverse to the cable portion extending between the jaws. The screw is positionable at an inclination to the jaws by pivoting of said member, and the weight of the barrel and the friction of the cable in contact with the jaws imposes an additional clamping force on the jaws. The barrel is released from its suspension and dropped to penetrate the solid material. A time-delay device operates a predetermined time after penetration to clamp the barrel to a lifting cable portion which is connected to the piston so that when the sampling device is lifted there will be no relative movement between the barrel and the piston therein.

---

The present invention relates to devices for taking solid samples of sediments from the soil, and more particularly to such devices used in oceanography.

As is well known, soil sampling devices of this kind are generally referred to as core barrels.

Among core barrels used in oceanography, one of the most common is the so-called "piston-type" sampler in which the core barrel contains a piston connected to the end of the supporting cable, this piston remaining stationary as the barrel bores through the medium.

By reason of the suction effect produced by the piston, this type of core barrel makes it possible to take very long samples measuring up to as much as about twenty metres.

With such samplers, penetration takes place under the effect of a weight connected to the core barrel. The weight and barrel assembly is customarily attached to a release gear secured to the main lowering cable. Release, i.e. dropping of the core barrel, occurs when an auxiliary weight suspended from a rocking arm reaches the seabed, whereupon the rocking motion of the arm releases the weight and barrel assembly and allows it to fall freely to the bottom of the sea.

Core barrels of this kind usually have certain disadvantages, due mainly to piston motion relative to the core barrel when the sampler is pulled up. Such relative motion takes place when the full length of the barrel does not penetrate the soil. In such cases a suction effect occurs which not only deforms the sample taken but also draws in sediment located at the bottom of the barrel. As a result, the sample taken no longer represents a faithful section of the soil since it contains a considerable proportion of sediment sucked in that distorts geological interpretation of the section. With this system, moreover, the sample core may be sectioned through in various places.

Various suggestions have been put forward for rigidly interconnecting the piston and the core barrel before pulling up the barrel. The means most often advocated for the purpose were control cables, but such cables have the drawback of increasing the risk of mishaps.

Other disadvantages inherent in systems designed heretofore concern the means used to secure the release gear to the lowering cable.

In current systems the release gear is usually secured by means of jaws tightened down by means of bolts. Such securing means are difficult to position and only moderately reliable, and insecure tightening can cause the release gear to slide down the lowering cable.

It is one object of the present invention to overcome the abovementioned disadvantages and to accordingly provide a core barrel of the kind referred to, comprising a release gear with a rocking arm fixed to the upper end part of a lowering cable and, suspended from said release gear, a sampler consisting of a core barrel equipped with a piston attached to the end lower part of said cable. Essentially a sampler according to the invention is characterized in that the means for securing the release gear to the upper end part of the lowering cable include a self-tightening device comprising two jaws, one of which is stationary and the other movable with the end of a screw capable of pivoting about a fixed axis perpendicular to the screw axis, whereby a displacement of the movable jaw along said cable causes the movable jaw to be fetched closer to the stationary jaw. In accordance with another feature of the invention, the sampler includes means for immobilizing the lower end part of the cable connected to said piston, which means comprise, mounted on the core barrel, a parallel-motion linkage having two parallel jaws the motion of which is controlled by a time-delay device triggered when the sampler is released.

In accordance with a subsidiary feature of the invention, the time-delay device consists of a cylinder containing a piston one face of which is spring-loaded while the other impels water through a calibrated passage.

The description which follows with reference to the accompanying drawings will disclose yet further features and advantages of the invention and will give a clear understanding of how the same can be carried into practice.

In the drawings:

FIGURE 1 shows schematically a conventional piston-type sampler;

FIGURE 2 is a front elevation view, partially cut away, of a device for securing the release gear of a sampler according to the invention;

FIGURE 3 is a section on the line III—III of FIGURE 2;

Figure 4:
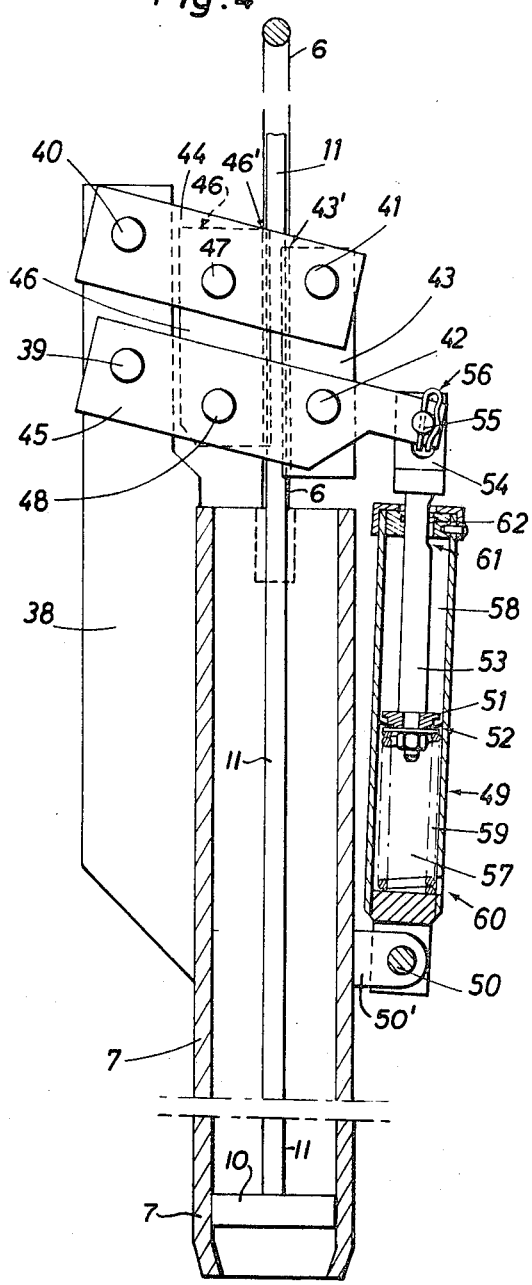
FIGURE 4 is a side elevation view in partial section of a device for immobilizing the piston within a core barrel of a sampler according to the present invention.

Referring first to FIGURE 1, there is shown thereon in diagrammatic form a conventional piston-type sampler used in the oceanography art. It comprises a lowering cable 1 to which is attached release gear RG having a release component beam-lever 2 fulcrumed about a pin 3 secured to the cable 1. Suspended from a depending elongated cable element 4 at the outer end of lever 2 is a weight 5. Hanging from the opposite arm 2′ of beam-lever 2, through the medium of a hanger means loop 6, is the sampler.

The sampler comprises a barrel 7 having a tapered tip 8. A weight 9 is fixed to the upper end of barrel 7. Accommodated for vertical axial movement within barrel 7 is a piston 10 to which the lower end part 11 of cable 1 is attached in such manner that when barrel 7 penetrates the medium forming the seabed, the cable portion 11 provided between the release gear and the piston 10 becomes taut and immobilizes piston 10. Upon reaching the end of its travel, barrel 7 is prevented from further downward movement relative to the piston 10 and hence to cable part 11 through the agency of a stop 12 provided in the upper end of barrel 7 and being engageable with the piston 10.

The various operations involved, which are naturally performed above the water, for example from aboard a ship, are as follows:

The sampler assembly is lowered into the sea by means of a winch (not shown). As soon as the weight 5 reaches the solid medium constituting the seabed, the beam-lever 2 is subjected only to the weight of the sampler assembly dependent from the loop 6, and consequently pivots about the pin 3, thereby releasing the loop 6 and hence the sampler which drops freely to the bottom of the sea.

As will readily be appreciated from the foregoing, the length of the lifting cable portion 11 is substantially equal to that of cable 4, whereby piston 10 is held stationary when barrel 7 begins to penetrate the seabed.

Manifestly, should barrel 7 fail to penetrate fully home into the seabed, then when the entire sampler assembly begins to be hoisted back to the surface, piston 10 will move relatively to barrel 7 until it butts against stop 12. As stated precedingly, this will cause any sediment at the base of barrel 7 to be drawn in, or the cored sample to be sectioned, or other undesirable phenomena to take place.

Another problem is connected with the means used to secure the release gear RG (pin 3, beam-lever 2–2′) to the cable part 1. Such securing means must be readily demountable and at the same time extremely reliable so as to make it impossible for the release gear to slip down the cable part 1.

FIGURES 2 and 3 show respectively in side elevation and plan view the device used to secure the release gear of a sampler according to the present invention to the lowering cable part 1. In these figures, like parts to those in FIGURE 1 are designated by like reference numerals. As in FIGURE 1, the device comprises a lowering cable part 1 and a release beam-lever 2, 2′ fulcrumed at 3.

Figure 6:
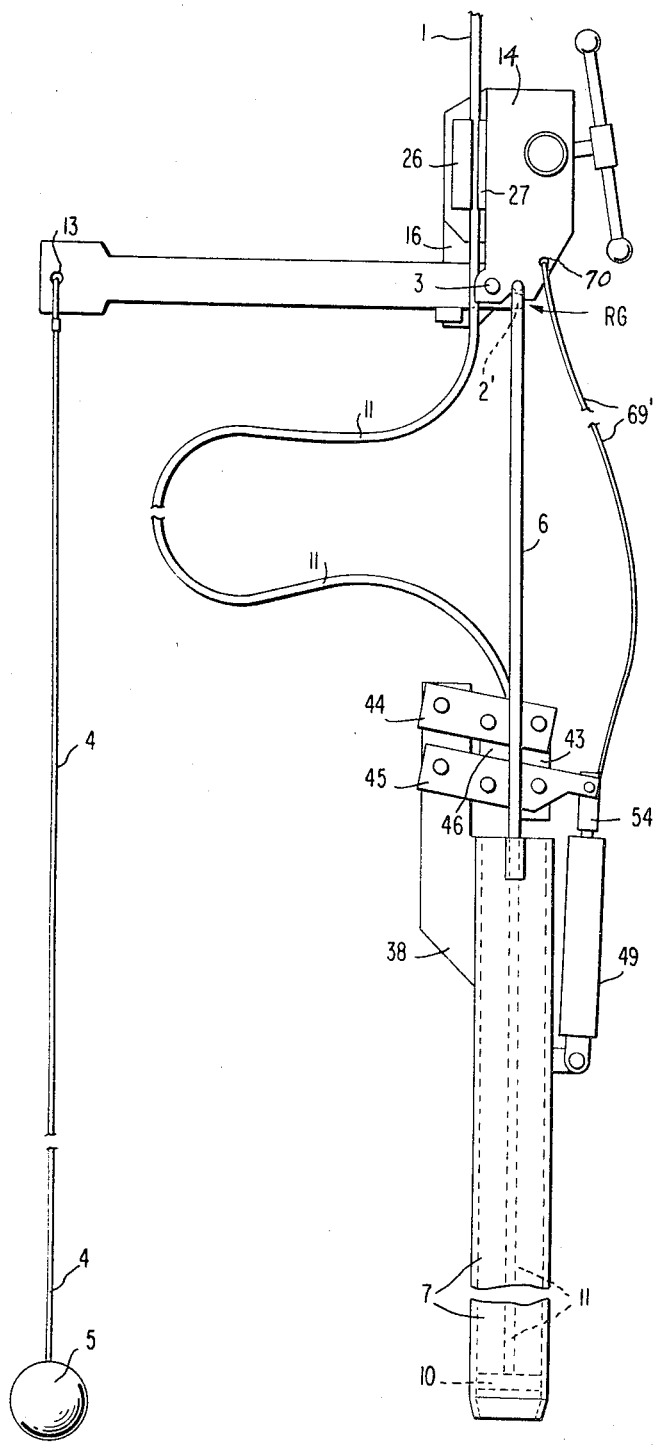
FIGURE 6 is a schematic view showing the interconnected relationship of parts shown in detail in FIGURES 2–5.

The end of arm 2 is formed with a hole 13 for attaching the cable 4 from which is suspended the weight 5, as shown in FIGURE 6.

Alternatively, instead of suspending a weight 5 from cable 4, a small auxiliary or pilot sampler may be hung therefrom and consist solely of a barrel and a weight whereby to take a sample proximate the surface of the medium constituting the seabed. This may prove useful since the sample taken by the main sampler adjacent this zone could be adversely affected by incorrect adjustment of the cable portion 11.

Means for releasably suspending the barrel 7 include the lowering cable portion 1, the structure shown in FIGURES 2 and 3 and described hereinafter, and the loop 6.

The subject device of this invention for securing the release gear includes a frame comprising two parallel plates 14 and 15, with plate 15 being extended in its lower portion by a further plate 16 welded to its side. The spacing between plates 14 and 15 is obtained by means of substantially rectangular blocks 17 and 18 respectively having holes 19, 20, 21 and 22, 23, 24 for receiving bolts (not shown) for securing the plates 14 and 15 together.

Each of plates 14 and 16 has a hole for the passage therethrough of pin 3, and each is formed with an indent 25 for passage of the loop 6 supporting the sampler assembly, to be described hereinafter.

As is clearly shown, beam-lever 2 includes a flat stub-arm 2′ which, when horizontal, supports the loop 6. When beam-lever 2 is horizontal, loop 6 is held captive in the indent 25 which is closed off by arm 2′.

The system used for fixing the plates 14 and 15 and the gear they support to the upper portion of the cable 1, one of the original features of the sampler according to the present invention, will now be described.

This system comprises a clamping device including two relatively movable jaws 26 and 27, of which the former is stationary and welded to plate 15 and the latter is movable between plates 14 and 15. These jaws are formed with grooves 26′ and 27′ respectively. Movement of jaw 27 is limited by the flat parts of blocks 17 and 18 and by two stops 28 and 29 on the latter.

Jaw 27 is formed with a hemispherical recess 30 into which engages the hemispherical tip of a screw 31 rotatable by a turn-handle 32.

Jaw 27 is additionally formed with two flat portions 33 and 34 for guiding the tip of screw 31, with the portion 34 furthermore providing a fastening point for a return spring 35 anchored to a peg 36 screwed into plate 15.

Screw 31 extends through a hole tapped in a pin member 37 capable of swivelling perpendicularly to plates 14 and 15, respectively formed with holes for receiving pin 37. The member 37 is mounted on the plates 14 and 15 to pivot about an axis transverse to the cable portion between the jaws 26 and 27, and offset from that cable portion. The screw 31 is shown positioned to extend along an axis inclined downwardly from the pin member 37 toward the jaw 27.

It will readily be appreciated that the system hereinbefore described provides self-clamping of the jaws 26, 27 for the greater the load supported by the lowering cable 1 the greater the force tending to move the jaws together. Clearly, any upward movement of jaw 27 relative to plates 14, 15 and 16 due to slipping of the whole system along cable portion 1 will cause screw 31 to pivot about pin 37 and cause the mobile jaw 27 to shift simultaneously towards stationary jaw 26 and clamp the cable portion 1.

To free the release gear from cable portion 1, all that is necessary is to loosen screw 31 by means of handle 32, thereby enabling jaw 27 to be moved rearwardly by spring 35. This operation can be performed only after the sampler assembly suspended from the release gear has dropped.

Figure 5:
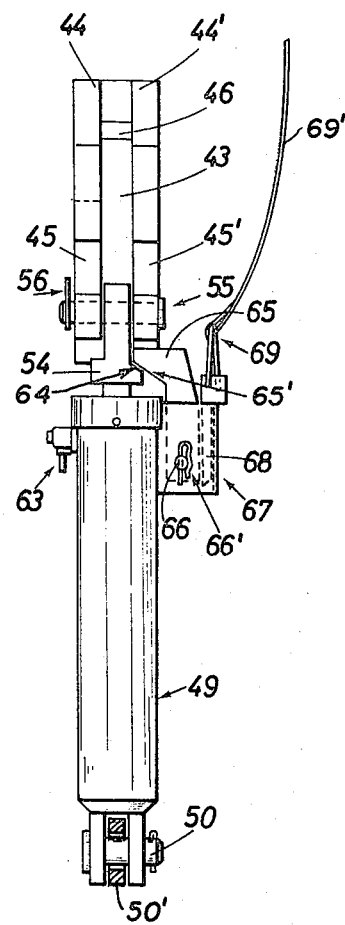
FIGURE 5 is a partial side view of the device shown in FIGURE 3.

Reference is next had to FIGURES 4 and 5 for front and side elevation views respectively of the device for immobilizing the cable portion 11 connected to the piston 10 in core barrel 7, whereby to prevent movement of the piston relative to the barrel when the sampler is pulled up.

Reference numeral 7 in FIGURE 4 designates the core barrel. Positioned to extend along the axis of barrel 7 is the cable portion 11 connected to the piston 10. The loop 6 welded to barrel 7 to enable the latter to be attached to the release gear is illustrated in FIGURE 4, and the barrel 7 is shown in FIGURE 5.

Welded to the side of barrel 7 is a plate 38, to the top of which is pivotally connected a parallel motion linkage comprising hinge-pins 39, 40 rigid with plate 38, two pairs of upper and lower links 44, 45 and 44', 45' pivoted at 40 and 39 respectively on opposite sides of the plate 38, and a substantially vertical link 43 pivoted at 41 to the links 44, 44' and pivoted at 42 to the links 45, 45'. As shown in FIGURE 5, the link 43 is located between the links 44 and 44' and between the links 45 and 45'.

Link 43 serves as a jaw formed with a groove 43'. Between the links 44 and 44' and between the links 45 and 45' is mounted a jaw 46 pivotally connected at 47 and 48 and formed with a groove 46'. In its normal position, cable portion 11 connected to the piston 10 extends between grooves 43' and 46'.

On the side of core barrel 7, diametrically opposite to plate 38, is welded a bracket 50' for mounting a cylinder 49 for pivoting about a pin 50 as hown in FIGURES 4 and 5. Cylinder 49 has slidably mounted therein a piston 51 bearing a leak tight seal 52. Fixed to this piston is a rod 53 the upper end 54 of which is pivotally connected to the links 45 and 45' through the agency of a pin 55 fitted with a retaining cotter-pin 56. Piston 51 separates cylinder 49 into two chambers 57 and 58, and chamber 57 contains a spring 59 which urges said piston upwardly. Chamber 57 is not leak tight, being vented through a hole 60. As is clearly visible, the upper end of rod 53 passes through an opening in the upper end of the cylinder 49 and is formed with an indent 61 designed to register with the aforesaid opening to enable chamber 58 to be filled when the assembly is submerged. As rod 53 moves upward, the extreme upper end of the chamber 58 is rendered leak tight by a seal 62 fitted to the upper end of cylinder 49. The water is then drained through a calibrated nozzle 63 a short distance below the upper end of the chamber 58 (see FIGURE 5).

As is clearly shown in FIGURE 5, the part 54 includes an oblique portion 64 against which engages the flat portion 65' of a latch 65 rotatable about a pin 66 carried in a rectangular member 67 and restrained by a safety-pin 66'. A linchpin 68 for preventing pivotal motion of the latch 65 is inserted between a wall of the rectangular member 67 and the side of latch 65 remote from cylinder 49.

Linchpin 68 is fitted with a loop 69 to which may be attached a wire 69', the other end of which is secured to the release-gear plate 14 shown in FIGURE 2. Reference to FIGURE 2 shows that plate 14 is formed with a hole 70 for attaching this wire. In operation, when the sampler is lowered, pivotal latch 65 is locked by linchpin 68. Piston 51 is then in its lowermost position as shown in FIGURE 4, and chamber 58 fills with water flowing through the indent 61.

As stated hereinabove, the sampler is released when the weight 5 reaches the bottom of the sea, thereby causing beam-lever 2 to swing over and the loop 6 and barrel 7 to be released and drop freely to the seabed. This drop obviously causes linchpin 68 connected by the wire 69' to plate 14 to be pulled out. This in turn causes latch 65 to pivot and thereby enables piston 51 to rise slowly through cylinder 49, its rate of ascension being dependent upon the section of nozzle 63. Upward motion of piston 51 activates the parallel motion linkage, whereby at the end of travel of the piston 51, jaws 43 and 46 clamp cable portion 11 and prevent any movement of the piston 10, to which it is connected, relative to barrel 7. When the sampler is pulled up, this system causes a self-tightening of jaws 43 and 46, for it will readily be understood that an upward pull on cable portion 11 when the piston is in its uppermost position will tend to shift the parallel motion linkage in the sense tending to move these jaws toward each other.

Calibrated nozzle 63 is adjusted so that the tightening effect of the jaws 43 and 46 will take place only after barrel 7 has penetrated into the medium to be sampled. A reasonably wide time-lapse or time-delay of about fifteen seconds is chosen in order to ensure that barrel 7 has ceased to sink before the tightening takes place.

Résumé of operation

At the beginning of a sampling operation, the cable part 1 is suspended, for example from a winch on a ship (not shown), and the clamping jaws 26 and 27 of the device shown in FIGURE 2 are clamped against the cable. Preliminary adjustable positioning of the device shown in FIGURE 2 relatively along the cable part 1 may be effected by turning the handle 32 to back off the screw 31 and release the clamping jaws 26 and 27 and permit relative sliding of the cable part 1 to the jaws, the screw 31 then being turned up to re-clamp the cable part 1 between the jaws 26 and 27. The barrel 7 will then be suspended from the plate structure of the device shown in FIGURE 2 by means of the loop 6 held in the indent or recess 25 by the arm 2' of the two-armed lever 2, 2'. The weight 5 will then be suspended from the free end 2 of the lever by means of the cable 4.

Referring to FIGURES 4–6, at the beginning of the sampling operation, the piston rod 53 will be held in its lowermost position, as shown in FIGURE 4, by the latch 65 which is retained in latching position by the pin 68. At the time, the wire 69' will connect the linchpin to the plate 14 of the device shown in FIGURE 2, but the wire will not be tensioned.

As the sampling assembly shown in FIGURES 4 and 5 is lowered below the water surface, water will flow into the cylinder chamber 58 by way of the indent 61 until the cylinder chamber 58 has been filled. As lowering of the assembly shown in FIGURES 4 and 5 continues, the actuating means constituted by the cable 4 and weight 5 will actuate the release component lever 2, 2' to release the loop 6. Thus, the weight 5 connected to the lever arm 2 will contact the solid material in the ocean bottom, thereby permitting the release lever component to swing clockwise as viewed in FIGURES 2 and 6, and release the loop 6 and permit the barrel 7 to drop. After a predetermined fall, the actuating means provided by the wire 69', connected between the linchpin 68 and plate 14 of the device shown in FIGURE 2, will be tensioned so as to pull the linchpin 68 out of engagement with the latch 65, thus permitting the latter to become disengaged from the upper end part 54 of the piston rod 53 by the camming action of the surface portions 64 and 65'. Then the operating spring means 59 will move the piston 51 upwardly in the cylinder 49, the movement being controlled by a dashpot action due to the restriction flow of water at a controlled rate from the cylinder chamber 58 outwardly through the nozzle 63 of the time-delay device. Upward movement of the piston 51 and rod 53 will move the parallel movement linkage in a manner to maintain the jaws 43 and 46 separated, thus leaving the barrel 7 free from suspension by the cable portion 11 and and permitting the vertical core barrel to drop and penetrate the seabed. During penetration of the barrel 7 into the seabed, the cable portion 11 and hence the piston 10 will remain stationary when the slack in the cable portion 11 has been taken up.

After the parts have come to rest at the end of a penetrating movement of the barrel 7 and after the lapse of a predetermined time, the piston element 51 will have completed its upward movement in the cylinder element 49 so as to operate the parallel motion linkage to clamp the jaws 43 and 46 of the cable engageable clamping device structure shown in FIGURE 4 against the lifting cable portion 11. The sample having been received in the barrel 7, the cable portion 1 is raised, thus also raising the cable portion 11, the barrel 7, and the piston 10 without causing or permitting any relative vertical movement between the piston 10 and the barrel 7. The prevention of such relative movement is one of the principal advantages of the present invention.

From the foregoing description it will be manifest that, in the event of incomplete penetration of barrel 7 into the sampling medium (as is generally the case), it is possible to immobilize the suction piston 10 inside the barrel 7.

The sample taken consequently exhibits a faithful section of the medium under study since no subsequent suction occurs when the sampler is raised to the surface.

The method of securing the release gear described precedingly permits very rapid rigging operations and ensures a very high degree of reliability by reason of the self-tightening system used on the lowering cable 1.

What is claimed is:

1. In a device for taking a sample of solid material, the combination of a vertical core barrel having an open lower end adapted to penetrate said material to cause the sample to be introduced into said barrel; a piston movable vertically axially in said barrel; suspension means for releasably suspending said barrel including a lowering cable portion, a clamp device comprising a frame, two relatively movable clamping jaws between which said cable portion extends mounted by said frame, a member mounted on said frame for pivotal movement about a pivot axis transverse to the cable portion extending between said jaws, said pivot axis being offset from said cable portion, a screw extending through and having threaded engagement with said member along an axis transverse to said pivot axis with one end of said screw engaging one of said jaws, said screw being positionable at an inclination to said jaws and to said cable portion extending therebetween by pivoting of said member, and said screw when rotated about its own axis moving said one of said jaws toward the other of said jaws to clamp said cable portion between said jaws, a release component mounted on said frame, and hanger means for releasably connecting said barrel to said release component; means for actuating said release component when said lowering cable portion has been lowered to position said suspension means and said barrel at a predetermined level relative to said solid material thereby to release said hanger means and permit said barrel to drop and penetrate said solid material; a lifting cable portion connected to said frame and extending downwardly therefrom; and means for connecting said lifting cable portion to said barrel after penetration of the latter into said solid material, whereby lifting of said lowering cable portion will raise said frame, said lifting cable portion and said barrel and extract the latter from said solid material with the sample in the barrel.

2. A device according to claim 1 in which said screw is positioned to extend at a downward inclination from said pivotally mounted member to the point of engagement of said one end of said screw with said one of said jaws, whereby the weight of said barrel and said frame tending to cause said frame and said jaws to move downwardly relatively to the cable portion between the jaws and the friction between said cable portion and said one of said jaws will cause said frame to move slightly downwardly relatively to said one of said jaws and thereby cause said screw to swing about the axis of said member so as to apply additional clamping pressure to said one of said jaws.

3. A device according to claim 1 in which said release component comprises a two-armed lever fulcrumed on said frame, said hanger means being suspended from one arm of said lever and being releasable therefrom upon rocking of said lever, said actuating means being connected to the other arm of said lever.

4. A device according to claim 3 in which said frame is formed with an indent which receives a part of said hanger means which is held in said indent by said one arm of said lever until the lever is actuated by said actuating means.

5. A device according to claim 3 in which said actuating means comprises an elongated element depending from said other arm of said lever; and a weight secured to the lower end of said elongated element, contacting of said weight with said solid material during lowering of said device effecting rocking of said lever to release said hanger means.

6. A device according to claim 1 in which said lifting cable portion is connected to said piston and in which said means for connecting said lifting cable portion to said barrel after penetration of the latter into said solid material comprises a cable engageable structure; means for maintaining said structure operatively disengaged from said lifting cable portion during penetration of said barrel to permit said barrel to move downwardly relatively to said piston, and for thereafter engaging said structure with said lifting cable portion, whereby raising of said lifting cable portion will raise said piston and said barrel together without relative movement of the piston to the barrel.

7. In a sampling device for taking a sample of solid material, the combination of a vertical core barrel having an open lower end adapted to penetrate said material to cause the sample to be introduced into said barrel; a piston movable vertically in said barrel; means for dropping said barrel and said piston to effect such penetration of said barrel and relative movement of said piston upwardly with respect to said barrel; and lifting means for raising said barrel, the sample therein and said piston together, without relative movement of said barrel and piston, said lifting means comprising a cable extending downwardly through said barrel and being connected to said piston, a cable engageable structure mounted on said barrel, operating means for maintaining said structure operatively disengaged from said cable during penetration of said barrel to permit said barrel to move downwardly relatively to said piston, and for thereafter engaging said structure with said cable, whereby lifting of said cable will raise said piston and said barrel together without movement of the piston relative to the barrel.

8. A sampling device according to claim 7 in which said cable engageable structure comprises a clamping device through which said cable extends, and in which said operating means comprises a time-delay device connected to said clamping device and being operable for effecting clamping of said cable by said clamping device following lapse of a predetermined time after actuation of the time-delay device; and actuating means operable in response to dropping of said barrel and said piston for actuating said time-delay device.

9. A sampling device according to claim 8 in which clamping device comprises a parallel motion linkage of which two links are clamping jaws between which said cable extends.

10. A sampling device according to claim 8 in which said time-delay device comprises a dashpot.

11. A sampling device according to claim 8 in which said time-delay device includes a cylinder element and a piston element within said cylinder element, one of said elements being connected to said barrel and the other of said elements being connected to said clamping device, said sampling device further including a latch for preventing relative movement of said cylinder and piston elements, said actuating means being operable for releasing said latch in response to dropping of said barrel element and said piston element.

12. A sampling device according to claim 11 including a piston rod connected to said piston element and extending through an opening in one end of said cylinder element and being connected to said clamping device; an indent in said piston rod element registrable with said opening for permitting liquid to flow into said cylinder element, said indent being registered with said opening when said latch is in latching position; a spring urging said piston element and rod to move in said cylinder element to position said indent out of registration with said opening thereby to prevent flow of liquid outwardly from said cylinder element through said opening, said spring being effective to so move said piston upon releasing of said latch; and a restricted flow nozzle for enabling discharge of liquid from said cylinder element at a controlled rate, thereby delaying movement of said piston element by said spring sufficient to operate said clamping device to clamp said cable.

References Cited

UNITED STATES PATENTS

| | | | |
|---|---|---|---|
| 1,060,386 | 4/1913 | Wachtel | 24—134 |
| 1,591,344 | 7/1926 | Reeves | 24—134 |
| 2,650,068 | 8/1953 | Rand | 175—6 |
| 2,798,378 | 7/1957 | Del Raso et al. | 73—421 X |
| 3,299,969 | 1/1967 | Inderbitzen | 175—5 |
| 3,318,394 | 5/1967 | Gleason et al. | 73—421 X |

LOUIS R. PRINCE, *Primary Examiner.*

D. M. YASICH, *Assistant Examiner.*

U.S. Cl. X.R.

24—134; 73—421; 175—5